United States Patent
zur Loye et al.

(10) Patent No.: US 6,907,870 B2
(45) Date of Patent: Jun. 21, 2005

(54) MULTIPLE OPERATING MODE ENGINE AND METHOD OF OPERATION

(75) Inventors: Axel O. zur Loye, Columbus, IN (US); Larry J. Brackney, Columbus, IN (US); Cariappa M. Chenanda, Columbus, IN (US); Robert M. Hurst, Columbus, IN (US); Lester L. Peters, Columbus, IN (US); Patrick M. Pierz, Columbus, IN (US); John F. Wright, Columbus, IN (US)

(73) Assignee: Cummins Inc., Columbus, IN (US)

( * ) Notice: Subject to any disclaimer, the term of this patent is extended or adjusted under 35 U.S.C. 154(b) by 96 days.

(21) Appl. No.: 10/762,354

(22) Filed: Jan. 23, 2004

(65) Prior Publication Data

US 2004/0149255 A1 Aug. 5, 2004

Related U.S. Application Data

(62) Division of application No. 10/387,579, filed on Mar. 14, 2003, now Pat. No. 6,684,849, which is a division of application No. 09/850,189, filed on May 8, 2001, now Pat. No. 6,561,157.
(60) Provisional application No. 60/202,850, filed on May 8, 2000.

(51) Int. Cl.$^7$ .................................................. F02P 1/00
(52) U.S. Cl. ............................... 123/594 R; 123/90.1; 123/27 R; 123/435
(58) Field of Search ........................... 123/90.1, 90.15, 123/90.16, 27 R, 435, 594

(56) References Cited

U.S. PATENT DOCUMENTS

| | | |
|---|---|---|
| 3,924,598 A | 12/1975 | Davis |
| 4,499,885 A | 2/1985 | Weissenbach et al. |
| 4,603,674 A | 8/1986 | Tanaka |

(Continued)

FOREIGN PATENT DOCUMENTS

| | | |
|---|---|---|
| DE | 195 19 663 A1 | 5/1996 |
| DE | 198 18 596 A1 | 11/1999 |
| EP | 0 747 636 A2 | 12/1996 |
| GB | 2 315 297 A | 1/1998 |
| WO | WO 01/46571 A1 | 6/2001 |

OTHER PUBLICATIONS

Shigeru Onishi et al., "Active Thermo–Atmosphere Combustion (ATAC)—A New Combustion Process for Internal Combustion Engines", SAE Technical Paper No. 790501, Feb. 26–Mar. 2, 1979.

Masaaki Noguchi et al., "A Study on Gasoline Engine Combustion by Observation of Intermediate Reactive Products during Combustion", SAE Technical Paper No. 790840, Sep. 10–13, 1979.

Paul M. Najt et al, "Compression–Ignited Homogeneous Charge Combustion", SAE Technical Paper No. 830264, (1983).

(Continued)

*Primary Examiner*—John Kwon
(74) *Attorney, Agent, or Firm*—Nixon Peabody LLP; Tim L. Brackett, Jr.; J. Bruce Schelkopf (57) ABSTRACT

A multi-mode internal combustion engine and method of operating the engine is provided which is capable of operating in a variety of modes based on engine operating conditions to enhance fuel efficiency and reduce emissions. The multi-mode engine include a fuel delivery system and control system for permitting the engine to operate in a diesel mode, a homogeneous charge dual fuel transition mode, a spark ignition or liquid spark ignition mode and/or a premixed charge compression ignition mode. The control system and method permits the engine operation to transfer between the various modes in an effective and efficient manner by controlling one or more fuel delivery devices or other engine components so as to move along a continuous transfer path while maintaining engine torque at a substantially constant level.

7 Claims, 6 Drawing Sheets

U.S. PATENT DOCUMENTS

| | | |
|---|---|---|
| 4,622,939 A | 11/1986 | Matekunas |
| 4,768,481 A | 9/1988 | Wood |
| 5,048,470 A | 9/1991 | Geddes et al. |
| 5,050,550 A | 9/1991 | Gao |
| 5,123,397 A | 6/1992 | Richeson |
| 5,467,757 A | 11/1995 | Yanagihara et al. |
| 5,476,072 A | 12/1995 | Guy |
| 5,535,716 A | 7/1996 | Sato et al. |
| 5,549,087 A | 8/1996 | Gray, Jr. et al. |
| 5,797,367 A | 8/1998 | Iida et al. |
| 5,832,880 A | 11/1998 | Dickey |
| 5,875,743 A | 3/1999 | Dickey |
| 5,890,459 A | 4/1999 | Hedrick et al. |
| 5,950,603 A | 9/1999 | Cook et al. |
| 6,032,617 A | 3/2000 | Willi et al. |
| 6,230,683 B1 | 5/2001 | zur Loye et al. |
| 6,240,895 B1 | 6/2001 | Oder |
| 6,276,334 B1 | 8/2001 | Flynn et al. |
| 6,286,482 B1 | 9/2001 | Flynn et al. |
| 6,321,157 B1 | 11/2001 | Sun et al. |
| 6,349,698 B2 | 2/2002 | Park |
| 6,352,490 B1 | 3/2002 | Makki et al. |
| 6,363,908 B1 | 4/2002 | Kerns |
| 6,386,177 B2 | 5/2002 | Urushihara et al. |
| 6,390,055 B1 | 5/2002 | Sivashankar et al. |
| 6,474,293 B1 | 11/2002 | Bauer et al. |
| 6,561,157 B2 | 5/2003 | zur Loye et al. |
| 6,575,132 B1 | 6/2003 | Ernst et al. |
| 6,595,181 B2 | 7/2003 | Najt et al. |
| 2001/0017127 A1 | 8/2001 | Flynn et al. |

OTHER PUBLICATIONS

R.H. Thring, "Homogeneous–Charge Compression–Ignition (HCCI) Engines", SAE Technical Paper No. 892068, Sep. 25–28, 1989.

Song–Charng Kong et al., "Modeling Combustion in Compression Ignition Homogeneous Charge Engines", SAE Technical Paper No. 920512, (1992).

Norimasa Iida, "Combustion Analysis of Methanol–Fueled Active Thermo–Atmosphere Combustion (ATAC) Engine Using a Spectroscopic Observation", SAE Technical Paper No. 940684, Feb. 28–Mar. 3, 1994.

Jun Harada et al., "Development of Direct Injection Gasoline Engine", SAE Technical Paper No. 970540, Feb. 24–27, 1997.

Allen W. Gray, III et al., "Homogeneous Charge Compression Ignition (HCCI) of Diesel Fuel", SAE Technical Paper No. 971676, May 5–8, 1997.

Norimasa Iida, "Alternative Fuels and Homogeneous Charge Compression Ignition Combustion Technology", SAE Technical Paper No. 972071, (1997).

Magnus Christensen et al., "Homogeneous Charge Compression Ignition (HCCI) Using Isooctane, Ethanol and Natural Gas—A Comparison with Spark Ignition Operation", SAE Technical Paper No. 972874, Oct. 13–16, 1997.

Jack Yamaguchi, "Honda Readies Activated Radical Combustion Two–Stroke Engine for Production Motorcycle", *Automotive Engineering,* Jan. 1997, pp. 90–92.

Don Williams, "Editor's EXP–2 Impression: Riding the $500,000 Honda", pp. 14–15.

J. Ray Smith, et al., "Homogeneous Diesel Combustion", Jun. 18, 1996, pp. 1–4.

"Clean Heavy–Duty Diesel Engine–II Program—Homogeneous Charge Compression Ignition (HCCI) of Diesel Fuel", SWRI Project No. 03–7479, Southwest Research Institute, Nov. 1997.

SI TO PCCI THROTTLE TRANSITION, 14.5:1. SI is phi=0.7, IMP=.9 BAR, PCCI is phi= 0.3, IMP=1.79 BAR, IMT=311 K (100 F) FOR BOTH. 1000RPM.

MULTIPLE OPERATING MODE ENGINE AND METHOD OF OPERATION

This application is a divisional of application Ser. No. 10/387,579, filed Mar. 14, 2003 now U.S. Pat. No. 6,884,849, which is a divisional of application Ser. No. 09/850,189, filed May 8, 2001, now U.S. Pat. No. 6,561,157, which is a non-provisional of provisional application Serial No. 60/202,850, filed May 8, 2000.

TECHNICAL FIELD

This invention relates generally to an internal combustion engine capable of operating in, and transitioning between, different operating modes including a premixed charge compression ignition mode, a diesel mode and/or spark ignition mode.

BACKGROUND OF THE INVENTION

For well over 75 years the internal combustion engine has been mankind's primary source of motive power. It would be difficult to overstate its importance or the engineering effort expended in seeking its perfection. So mature and well understood is the art of internal combustion engine design that most so called "new" engine designs are merely designs made up of choices among a variety of known alternatives. For example, an improved output torque curve can easily be achieved by sacrificing engine fuel economy. Emissions abatement or improved reliability can also be achieved with an increase in cost. Still other objectives can be achieved such as increased power and reduced size and/or weight but normally at a sacrifice of both fuel efficiency and low cost.

The challenge to contemporary designers has been significantly increased by the need to respond to governmentally mandated emissions abatement standards while maintaining or improving fuel efficiency. In view of the mature nature of engine design, it is extremely difficult to extract both improved engine performance and emissions abatement from further innovations of the basic engine designs commercially available today. Yet the need for such innovations has never been greater in view of the series of escalating emissions standards mandated for the future by the United States government and other countries. Attempts to meet these standards include some designers looking for a completely new engine design.

Traditionally, there have been two primary forms of reciprocating piston or rotary internal combustion engines: diesel and spark ignition engines. While these engine types have similar architecture and mechanical workings, each has distinct operating properties which are vastly different from each other. Diesel and spark ignited engines effectively control the start of combustion (SOC) using simple, yet distinct means. The diesel engine controls the SOC by the timing of fuel injection. In a spark ignited engine, the SOC is controlled by the spark timing. As a result, there are important differences in the advantages and disadvantages of diesel and spark-ignited engines. The major advantage that a spark-ignited natural gas, or gasoline, engine has over a diesel engine is the ability to achieve extremely low NOx and particulate emissions levels. The major advantage that diesel engines have over premixed charge spark ignited engines (such as passenger car gasoline engines and lean burn natural gas engines) is higher thermal efficiency. One key reason for the higher efficiency of diesel engines is the ability to use higher compression ratios than premixed charge spark ignited engines (the compression ratio in premixed charge spark ignited engines has to be kept relatively low to avoid knock). A second key reason for the higher efficiency of diesel engines lies in the ability to control the diesel engine's power output without a throttle. This eliminates the throttling losses of premixed charge spark ignited engines and results in significantly higher efficiency at part load for diesel engines. Typical diesel engines, however, cannot achieve the very low NOx and particulate emissions levels which are possible with premixed charge spark ignited engines. Due to the mixing controlled nature of diesel combustion a large fraction of the fuel exists at a very fuel rich equivalence ratio which is known to lead to particulate emissions. Premixed charge spark ignited engines, on the other hand, have nearly homogeneous air fuel mixtures which tend to be either lean or close to stoichiometric, resulting in very low particulate emissions. Another consideration is that the mixing controlled combustion in diesel engines occurs when the fuel and air exist at a near stoichiometric equivalence ratio which leads to high temperatures. The high temperatures, in turn, cause high NOx emissions. Lean burn premixed charge spark ignited engines, on the other hand, burn their fuel at much leaner equivalence ratios which results in significantly lower temperatures leading to much lower NOx emissions. Stoichiometric premixed charge spark ignited engines, on the other hand, have high NOx emissions due to the high flame temperatures resulting from stoichiometric combustion. However, the virtually oxygen free exhaust allows the NOx emissions to be reduced to very low levels with a three-way catalyst.

Relatively recently, some engine designers have directed their efforts to another type of engine which utilizes premixed charge compression ignition (PCCI) or homogeneous charge compression ignition (HCCI), hereinafter collectively referred to as PCCI. Engines operating on PCCI principles rely on autoignition of a relatively well premixed fuel/air mixture to initiate combustion. Importantly, the fuel and air are mixed upstream of the cylinder, e.g., in the intake port, or in the cylinder, long before ignition occurs. The extent of the mixture may be varied depending on the combustion characteristics desired. Some engines are designed and/or operated to ensure the fuel and air are mixed into a homogeneous, or nearly homogeneous, state. Also, an engine may be specifically designed and/or operated to create a somewhat less homogeneous charge having a small degree of stratification. In both instances, the mixture exists in a premixed state well before ignition occurs and is compressed until the mixture autoignites. Thus, PCCI combustion is characterized in that: 1) the vast majority of the fuel is sufficiently premixed with the air to form a combustible mixture throughout the charge by the time of ignition; and 2) ignition, that is, the very onset or start of combustion, is initiated by compression ignition. Unlike a diesel engine, the timing of the fuel delivery, for example the timing of injection, in a PCCI engine does not strongly affect the timing of ignition. Preferably, PCCI combustion is characterized in that most of the mixture is significantly leaner than stoichiometric to advantageously reduce emissions, unlike the typical diesel engine cycle in which a large portion, or all, of the mixture exists in a rich state during combustion.

Because an engine operating on PCCI combustion principles has the potential for providing the excellent fuel economy of the diesel engine while providing NOx and particulate emissions levels that are much lower than that of current spark-ignited engine, it has also recently been the subject of extensive research and development. U.S. Pat. Nos. 4,768,481; 5,535,716; and 5,832,880 all disclose engines and methods for controlling PCCI combustion in engines. Researchers have used various other names in referencing PCCI combustion including homogeneous charge compression ignition (HCCI) as well as others such as "ATAC" which stands for "Active Thermo-Atmosphere Combustion." (SAE Technical Paper No. 790501, Feb. 26–Mar. 2, 1979), "TS" which stands for "Toyota-Soken" (SAE Technical Paper No. 790840, Sep. 10–13, 1979), and "CIHC" which stands for "compression-ignited homogeneous charge" (SAE Paper No. 830264, 1983). All of these terms are hereinafter collectively referred to as PCCI.

Although PCCI combustion may result in improved fuel economy and substantially reduced emissions, it is difficult for an engine to operate in a PCCI mode over a wide range of operating conditions, ranging from cold start-up to various levels of engine load. For example, SAE Technical Paper No. 790501 reports that PCCI combustion (ATAC) could be made to occur in a two-stroke engine at low load over a wide speed range. To attain PCCI combustion, the following conditions were found to be important. The quantity of mixture and the air/fuel ratio supplied to the cylinder must be uniform from cycle to cycle. The scavenging "directivity" and velocity must have cyclic regularity to ensure the correct condition of the residual gases remaining in the cylinder. The temperature of the combustion chamber walls must be suitable. The scavenging passage inlet must be located at the bottom of the crankcase. It was found that at very light loads, PCCI was not successful because charge temperatures were too low. At very high loads, PCCI was not successful because the residual gas quantity was too low. In between these regions, PCCI combustion was successful.

As a result, research has been directed to an engine capable of operating in multiple combustion modes. For example, SAE Technical Paper No. 892068, entitled "Homogeneous-Charge Compression Ignition (HCCI) Engines", Thring, R., Sep. 25, 1989, investigated PCCI operation of a four-stroke engine. The paper suggests an engine that would operate in a conventional spark-ignition mode at start-up and at high loads, but in a PCCI mode at part-load and idle. Others have produced two-stroke motorcycle engines which successfully use a spark to initiate combustion upon starting the engine, at the lowest load conditions, such as idling, and at high loads while operating in a PCCI mode during a low to mid-load range. The change-over between spark-ignition and PCCI modes is controlled by an electronic control unit. SAE papers 920512 and 972874 are noted for disclosing experimental results comparing PCCI combustion to spark-ignition combustion, but fail to specifically teach the manner in which transitions between modes of operation could be most effectively achieved. German Patent No. 198 18 596 also discloses a process of operating an engine in a PCCI mode at least low loads and in a spark-ignition mode at high loads.

Other efforts have focused on the combination of a diesel combustion operating mode and a PCCI mode. For example, SAE paper No. 971676 entitled "Homogeneous Charge Compression Ignition (HCCI) of Diesel Fuel" reports test results of an engine which includes starting in a diesel combustion mode and, once the temperature of the engine stabilized, configuring the engine to a PCCI mode. U.S. Pat. No. 5,875,743 discloses an engine which operates in a diesel combustion mode in response to engine operating parameters indicative of engine speed and load values within a first predefined range, and in a PCCI mode in response to engine operating parameters indicative of engine speed and load within a second predefined range. Generally, the engine appears to operate in a diesel mode during light and heavy loads and in a PCCI mode at other conditions. A look-up table may be used to define the speed and load ranges at which the engine will run in conventional diesel mode, and the speeds and load ranges the engine will switch to the PCCI mode. If misfire or knock is detected, the PCCI mode can be adjusted or the engine switched back to the diesel mode. Transition between the diesel mode to the PCCI mode is primarily accomplished by switching between an in-cylinder fuel injector and a port injector for early injection and mixing of fuel, or varying the timing of injection of the in-cylinder injector.

Patent application Ser. No. 08/916,437 filed on Aug. 22, 1997 (published as International Patent Application No. PCT/US97/14815), currently assigned to the Assignee of the present invention, discloses an engine and method of operation which includes multiple combustion modes. The engine is switched between a conventional diesel mode and/or spark-ignited mode and a PCCI mode depending on the operating conditions of the engine.

Still, there is a need for an engine, and method of engine operation, which includes more effectively and more efficiently operating in, and transitioning between, a PCCI mode and one or both of a diesel mode and a spark-ignition mode.

SUMMARY OF THE INVENTION

A general object of the subject invention is to overcome the deficiencies of the prior art by providing a practical multi-mode engine and a method for operating the engine in various modes and effectively and efficiently transferring operation between the various modes.

Another object of the present invention is to provide a multi-mode internal combustion engine having minimum complexity and maximum robustness while maximizing efficiency.

Yet another object of the present invention is to provide a multi-mode internal combustion engine capable of transitioning between a diesel mode while maximizing natural gas usage and minimizing diesel flow rates.

Still another object of the present invention is to provide a multi-mode engine and control system which achieves a higher gas substitution rate thereby reducing operating costs due to the lower costs of natural gas per BTU.

A further object of the present invention is to provide a multi-mode engine capable of smoothly transitioning between various modes of operation/combustion in a manner to obtain a smooth and controlled power delivery and sound quality from the engine.

A still further object of the present invention is to provide a multi-mode engine and control system capable of effectively placing the engine in a homogeneous charge dual fuel transition mode for transitioning between the various modes of operation.

A still further object of the present invention is to provide a multi-mode engine and control scheme for controlling the engine in a manner to optimally minimize emissions, especially oxides of nitrogen and particulate emissions, while maximizing efficiency.

Still another object of the present invention is to provide a multi-mode engine which permits a cold engine to be more easily started and then transitioned to one or more other modes based on engine operating conditions.

A further object of the present invention is to provide a multi-mode engine capable of operating on a single fuel throughout various combustion modes.

A still further object of the present invention is to provide a multi-mode engine capable of effectively transferring operation between a spark ignited mode and a PCCI mode by rapidly changing the equivalence ratio while maintaining the engine torque essentially constant.

A further object of the present invention is to provide a multi-mode engine capable of transferring engine operation between operating modes while avoiding very heavy, destructive knock, misfire, carbon monoxide emissions and/or undesirable levels of unburned hydrocarbons.

Yet another object of the present invention is to provide a multi-mode engine and control system which effectively control characteristics of the combustion event, such as the timing of the start of combustion, during the various modes and during transfer between the various modes to ensure stable combustion, low emissions, acceptable pressure levels and optimum efficiency.

The above objects and others are achieved by providing a multi-mode internal combustion engine capable of operating in a plurality of modes for engine operation, comprising an engine body, a combustion chamber formed in the engine body, an intake air system for delivering intake air to the combustion chamber, a fuel delivery system mounted on the engine body to deliver a first fuel into the combustion chamber while the engine operates in a diesel mode and a homogeneous charge dual fuel transition mode, and to deliver a second fuel into at least one of the intake air system and the combustion chamber when the engine operates in a premixed charge compression ignition mode and in the homogeneous charge dual fuel transition mode. The engine also includes a control system adapted to transfer engine operation between the diesel mode and the homogeneous charge dual fuel transition mode and between the homogeneous charge dual fuel transition mode and the premixed charge compression ignition mode.

The control system may be adapted to cause the fuel delivery system to deliver a primary quantity of the first fuel into the combustion chamber when in the diesel mode and, when transferring engine operation to the homogeneous charge dual fuel transition mode, to cause the fuel delivery system to deliver a quantity of the second fuel into at least one of the intake air system and the combustion chamber while decreasing the primary quantity of the first fuel to maintain engine torque at a substantially constant level and to place the engine in the homogeneous charge dual fuel transition mode. The control system may further be adapted to cause the fuel delivery system to decrease the primary quantity of the first fuel while increasing the quantity of the second fuel so that the quantity of the second fuel comprises a substantial portion of the total delivered fuel energy. The control system may further be adapted to control a start of combustion in the combustion chamber and adjust the start of combustion to occur prior to delivery of the primary quantity of the first fuel. The control system may further be adapted to cause the fuel delivery system to deliver an early pilot quantity of the first fuel prior to a combustion in the combustion chamber when in the homogeneous charge dual fuel transition mode. The control system may be further adapted to cause the fuel delivery system to increase the early diesel pilot quantity of the first fuel sufficiently to cause the start of combustion to occur prior to the delivery of the primary quantity of the first fuel. Moreover, the control system may cause the fuel delivery system to deliver a post-ignition injection of the first fuel into the combustion chamber after a start of combustion of a premixed charge of the second fuel and air in the combustion chamber when in the premixed charge compression ignition mode to operate the engine in a post premixed ignition mode. The control system may also cause the fuel delivery system to deliver an early pilot quantity of the first fuel prior to a start of combustion of a premixed charge of the second fuel and air in the combustion chamber when in the premixed charge compression ignition mode. The first fuel may be one of diesel fuel, kerosene and gasoline and the second fuel may be one of natural gas and propane. The present invention is also directed to a method of operating an internal combustion engine in the plurality of modes and transferring operation between the plurality of modes which includes operating the engine in the diesel mode, operating the engine in the premixed charge compression ignition mode and operating the engine in a homogeneous charge dual fuel transition mode when transferring engine operation between the diesel mode and the premixed charge compression ignition mode. The engine may use a single fuel for all modes of operation and the single fuel may be diesel fuel or gasoline. The amount of the single fuel provided to a combustion chamber may be adjusted to adjust a timing of a start of combustion. Also, the timing of an opening of an intake valve associated with the combustion chamber may be controlled to vary an effective compression ratio to control a start of combustion. An exhaust gas may also be directed into the combustion chamber to control a start of combustion. The method may include the step of sensing a combustion characteristic, generating a combustion characteristic signal and controlling a start of combustion based on the combustion characteristic signal. The method may also include operating the engine in a spark ignition mode and operating the engine in a homogeneous charge dual fuel transition mode when transferring engine operation between the premixed charge compression ignition mode and the spark ignition mode. The spark ignition mode may include a liquid spark comprising a pilot quantity of fuel for igniting a premixed charge of fuel and air.

The objects are also achieved by providing a multi-mode internal combustion engine capable of operating in a plurality of modes wherein the control system is adapted to transfer engine operation between a spark ignition mode and a homogeneous charge dual fuel transition mode and between the homogeneous charge dual fuel transition mode and the premixed charge compression ignition mode. The method associated with transferring operation between a spark ignition mode and a premixed charge compression ignition mode via the homogeneous charge dual fuel transition mode may also include a step of providing intake air and a second fuel to the combustion chamber and providing a throttle in the intake system for controlling the intake flow of at least one of the intake air and a premixed charge of intake air and the second fuel. The method may further include the step of operating the engine in the spark ignition mode with throttle valve partially closed to restrict the intake flow into the combustion chamber wherein the premixed charge of the second fuel and air has an equivalence ratio greater than 0.5. The method may also include the step of decreasing a quantity of the second fuel in the premixed charge while increasing a quantity of a first fuel delivered into the combustion chamber in a manner to maintain engine torque at a substantially constant level and to reduce the equivalence ratio of the premixed charge to less than 0.5. The method would then open the throttle valve to increase intake flow and terminate the flow of the first fuel into the combustion chamber to transfer the engine to the premixed charge compression ignition mode. This method may include opening the throttle valve and terminating the flow of the first fuel nearly simultaneously while maintaining the total delivered fuel energy at a substantially constant level. Moreover the method may include the step of opening the throttle valve to increase the intake flow in a manner which approximately doubles a total amount of second fuel delivered to the combustion chamber. The method may also decrease the quantity of the second fuel while increasing the quantity of the first fuel until the second fuel and the first fuel each contribute approximately 50% of the total delivered fuel energy.

The present invention is also directed to a method of operating an internal combustion engine in a plurality of modes for engine operation and transferring operation between the modes which includes delivering fuel into one of the intake port and the combustion chamber at a predetermined flow rate, operating the engine in a spark ignition mode with the throttle valve partially closed to restrict intake air flow to the intake port wherein the fuel and the intake air form a premixed charge having an equivalence ratio greater than 0.5. This method includes the step of opening the throttle valve to increase the intake air flow while maintaining the predetermined fuel rate substantially. constant to reduce the equivalence ratio of the premixed charge to less than 0.5 to place the engine a premixed charge compression ignition mode. The present invention is also directed to a multi-mode engine and method of operating the engine which enables the engine to transfer between a spark ignition mode and a premixed charge compression ignition mode by adjusting the timing of the closing of the intake valves via a variable valve timing system.

DETAILED DESCRIPTION OF THE INVENTION

The present invention as described in further detail hereinbelow is directed to an improved internal combustion engine capable of operating in and transitioning or transferring between different operating modes to improve fuel efficiency and reduce exhaust emissions while increasing startability and load handling across a range of engine operating conditions. Specifically, the multi-mode engine of the present invention, as generally shown at 10 in FIG. 1, may be operated in a premixed charge compression ignition (PCCI) mode, a diesel mode, a spark ignition (SI) mode and a homogeneous charge dual fuel transition (HCDFT) mode. A PCCI mode of operation refers to a combustion event wherein: 1) the majority of fuel is sufficiently premixed with air to form a combustible mixture throughout the charge at the time of ignition; and 2) ignition (start of combustion) is initiated by compression ignition, which includes homogeneous charge compression ignition (HCCI) engines. It should be noted that the term PCCI as used herein does not exclude the use of ignition timing mechanisms such as pilot injections and spark ignition to precisely time the start of combustion of a premixed charge where the vast majority of the premixed charge will burn by compression ignition without the presence of a self-sustaining propagating flame front such as in a spark ignited engine. This allows a PCCI engine to combust a mixture that is too lean to support a self-sustaining flame front thereby allowing a premixed charge leaner than is possible in a spark ignited engine. The diesel mode as referred to herein means the conventional diesel cycle and combustion, which includes controlling the start of combustion (SOC) by the timing of the fuel injection. The spark ignited (SI) mode means the standard Otto cycle wherein the SOC is controlled by the spark timing. Importantly, it should be understood that the spark may be either electrically produced or in the form of a pilot quantity of fuel, referred to herein as liquid spark ignited (LSI). For purposes of this application, the term spark ignited or spark ignition or SI is understood to include the use of either an electric or a liquid spark. The homogeneous charge dual fuel transition (HCDFT) mode occurs when a first fuel quantity is made early in the process to form a mixture too lean to propagate a self-sustaining flame and a second fuel quantity larger than a pilot quantity (and preferably a different fuel from the first fuel) is delivered later, e.g. near top dead center. It should be initially noted that the present invention may be applied to various types of internal combustion engines that combust various fuels including, but not limited to, natural gas, gasoline, propane, hydrogen, diesel, kerosene, naphtha and/or other fuels.

Figure 1:
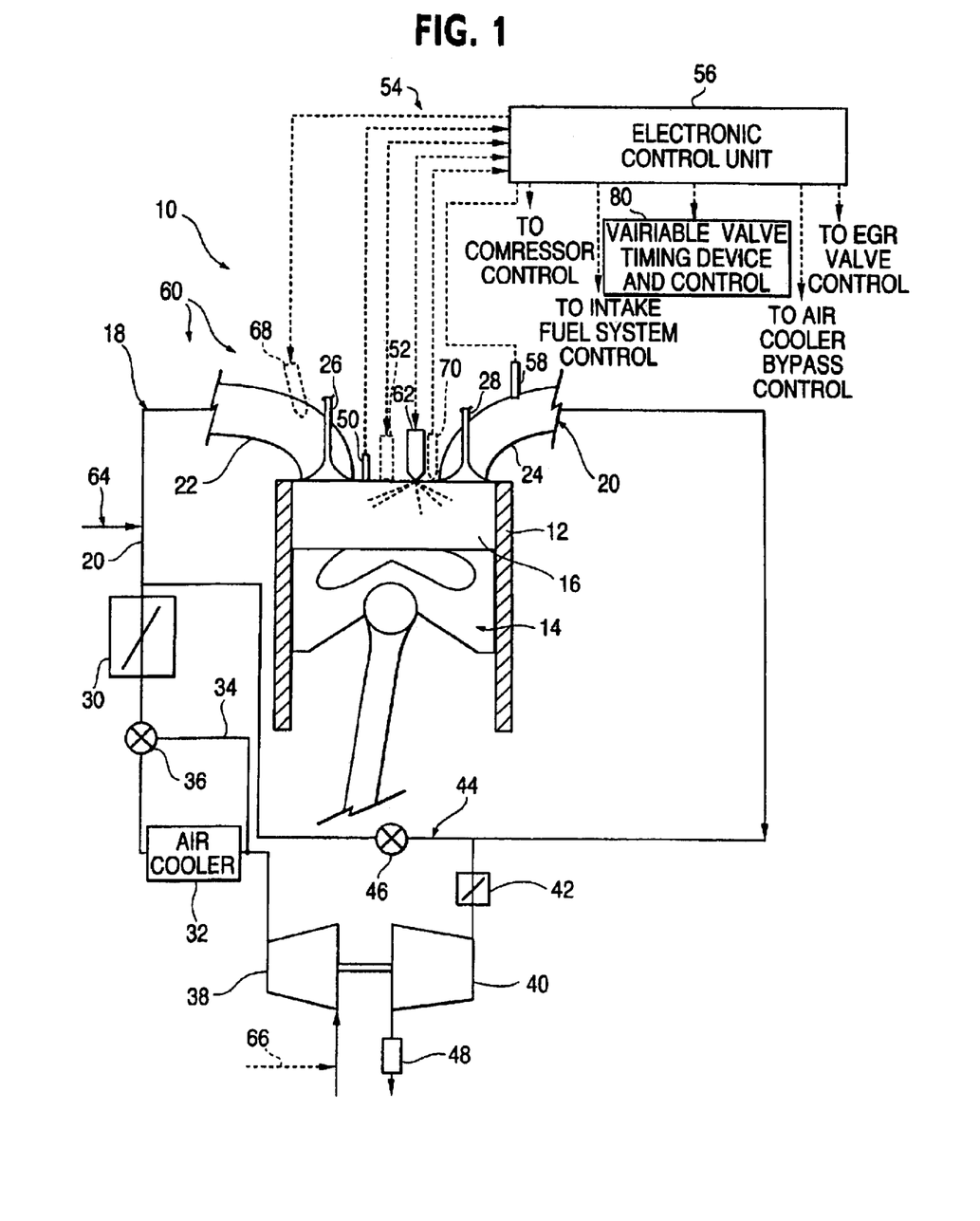
FIG. 1 is a schematic diagram of one embodiment of the present invention showing a single cylinder of the multi-mode engine and associated control system.

Referring to FIG. 1, there is shown an exemplary embodiment of multimode engine 10 capable of transferring between two or more modes of operation. Multi-mode engine 10 includes an engine body 12 with a piston assembly 14 reciprocally mounted therein. Piston assembly 14 and engine body 12 forms a combustion chamber 16 in a manner well known in the art. Multi-mode engine 10 also includes an intake system 18 for delivering intake air or a combination of intake air and fuel to combustion chamber 16 and an exhaust system 20 for removing exhaust gas from combustion chamber 16. Although only one cylinder is illustrated in FIG. 1, the present invention may be utilized in internal combustion engines of various configurations including engines having any number of cylinders, for example, four, five, six, eight, ten, twelve or sixteen cylinders. In addition, although the present multi-mode engine is primarily discussed with reference to a four-stroke engine, the present control system and engine may be in the form of a two-stroke engine.

Intake system 18 includes an intake manifold 20 and an intake port 22 for directing intake air or an air/fuel mixture into combustion chamber 16. Likewise, exhaust system 20 includes an exhaust port 24 for directing exhaust gas as described hereinbelow. One or more intake valves, such as intake valve 26, and one or more exhaust valves, such as exhaust valve 28, are positioned in the respective ports and moved between open and closed positions by a conventional valve control system, or a variable valve timing system, to control the flow of intake air or air/fuel mixture into, and exhaust gases out of, the cylinder, respectively. Intake system 18 may further include a throttle 30 for controlling intake manifold pressure and thus intake air, or air/fuel mixture, flow through intake system 18. Throttle 30 may also be used as an effective way of transferring between different modes of operation as discussed more fully hereinbelow. An air cooler 32 may also be provided to control the temperature of the intake air or air/fuel mixture. An air cooler bypass circuit 34 and bypass valve 36 may be provided to more effectively control the quantity of air or air/fuel mixture flow through air cooler 32 thereby permitting more control over the temperature of the intake flow. A compressor 38 may be provided along intake air system 18, upstream of intake manifold 20 and air cooler 32, for varying boost intake pressure. Compressor 38 may be driven by any conventional means, such as an exhaust gas driven turbine 40. An exhaust restriction or throttle 42 may be positioned upstream of exhaust turbine 40 to permit greater control over the combustion process, e.g. controlling the residual mass fraction to control the SOC. Although not shown, a waste gate valve may also be provided in a conventional manner to regulate the amount of exhaust gas applied to turbine 40 thereby varying the intake pressure as desired. Another important way to control intake temperature and thus SOC is by using hot exhaust gas recirculation (EGR). An EGR circuit 44 may be used to direct hot exhaust gas from upstream of turbine 40 into intake system 18. EGR circuit 44 includes an EGR control valve 46 for controlling the recirculation of exhaust gas. Exhaust system 20 may also be provided with an exhaust gas treatment device 48, such as an oxidation catalyst 48, for treating the exhaust gas. Engine 10 may also include combustion sensor 50 for sensing a combustion characteristic, such as a cylinder pressure sensor, and generating a signal corresponding to the combustion characteristic. Preferably, a cylinder pressure sensor is provided on any or all engine cylinders for sensing, on a cycle-by-cycle basis, the SOC. Of course, combustion sensor 50 may also provide other combustion data, such as combustion rate, combustion duration, crank angle at which peak cylinder pressure occurs, combustion event or heat release location and end of combustion data, any one of which may be used instead of the start of combustion data to effectively control combustion. While in the present embodiment, the sensor 50 that provides the pressure data signal is a pressure sensor, other sensors may also be used that provide a signal indicative of cylinder pressure such as through use of correlating pressure data. Such sensors include accelerometers, ion probes, optical diagnostics, strain gages, load washers, and/or fast thermocouples in or near the cylinder head, liner or piston. Also, torque or RPM sensors could be used to detect changes in engine torque and RPM associated with each combustion event. In one embodiment, the engine may also be provided with a spark plug 52 for operating in an electronic spark ignition mode.

Multi-mode engine 10 also includes a control system indicated generally at 54 which includes an electronic control unit 56 designed to receive a variety of engine condition signals from various engine components as shown in FIG. 1, such as combustion sensor 50 and an engine position sensor (not shown), process the signals and provide control signals to the appropriate engine components to effectively control combustion, for example the start of combustion, during each of the operating modes and to achieve effective and efficient transfer of engine operation between the modes of operation. For example, electronic control unit 56 may control one or more of a temperature control system for varying the temperature of the intake air or a mixture of fuel and intake air, a pressure control system for varying the pressure of the mixture, the equivalence ratio control system for varying an equivalence ratio of the mixture and a mixture autoignition property control system for varying an autoignition property of the mixture so as to effectively control the start of combustion. The specific details of variably controlling components associated with a combustion control system has been discussed in patent application Ser. No. 09/255,780 filed on Feb. 23, 1999, currently assigned to the assignee of the present invention and published as international patent application No. PCT/US99/03289, the entire contents of which is hereby incorporated by reference. It should be noted that the inventions of the present application may be used with either closed-loop control of PCCI combustion or open loop control depending on the application and controllability. It should be understood that the multi-mode engine of the present invention may include one or more of the aforementioned control system components to effectively control combustion. In the present embodiment, ECU 56 preferably controls air cooler bypass valve 36, EGR valve 46, spark plug 52 if provided, and various fuel delivery/injection components including an intake fuel system at 64 or 66, described more fully hereinbelow. ECU 56 may also control throttle 30 and exhaust restriction 42. ECU 56 may also receive signals from an exhaust sensor 58 which assists in determining the quality of combustion or the start of combustion by measuring, and providing signals relating to, carbon monoxide, oxygen, oxides of nitrogen, unburned hydrocarbons (UHC), water and/or carbon dioxide.

Multi-mode engine 10 further includes a fuel delivery system indicated generally at 60 including, in the preferred embodiment, a direct fuel injector 62 for injecting high pressure fuel into combustion chamber 16 at the appropriate time during the engine cycle to achieve the desired effect. Direct injector 62 may be used to inject fuel, i.e. diesel fuel, near top dead center position to achieve diesel combustion when operating in a diesel mode; to inject an early diesel pilot quantity when operating in the homogeneous charge dual fuel transition (HCDFT) mode and/or the premixed charge compression ignition mode to, for example, assist in controlling the timing of the start of combustion without initiating combustion at the time of injection; to inject diesel fuel during the HCDFT mode as discussed more fully hereinbelow; to inject a pilot quantity of fuel during the liquid spark ignition mode and/or inject fuel early in the engine cycle when the engine is using only a single fuel to achieve, for example, diesel mode operation and premixed charge compression ignition mode operation. In the preferred embodiment, fuel delivery system 60 also includes an upstream fuel supply delivered into intake system 18. Preferably, the fuel supply is introduced into intake manifold 20 at 64 by a mixer or carburetor to allow the fuel to premix with the air sufficient for premixed charge compression ignition and spark ignition modes. Alternatively, the upstream fuel supply may be introduced upstream of compressor 38 at 66 or into intake port 22 via a port injector 68. Also, alternatively, a second direct injector 70 may be utilized for directly injecting a fuel different from the fuel injected by direct injector 62. For example, in an embodiment utilizing direct injector 62 and direct injector 70, direct injector 62 may inject diesel fuel for diesel mode, early diesel pilot and post-ignition injections while direct injector 70 injects a gaseous fuel, such as natural gas, for premixed charge compression ignition mode and transition modes as discussed more fully hereinbelow. Alternatively, direct injector 62 and direct injector 70 may be combined into a single injector capable of injecting the two different fuels. Each of the fuel delivery devices discussed above are preferably controlled electronically by ECU 56 for controlling the timing and quantity of a particular fuel injection.

Figure 2:
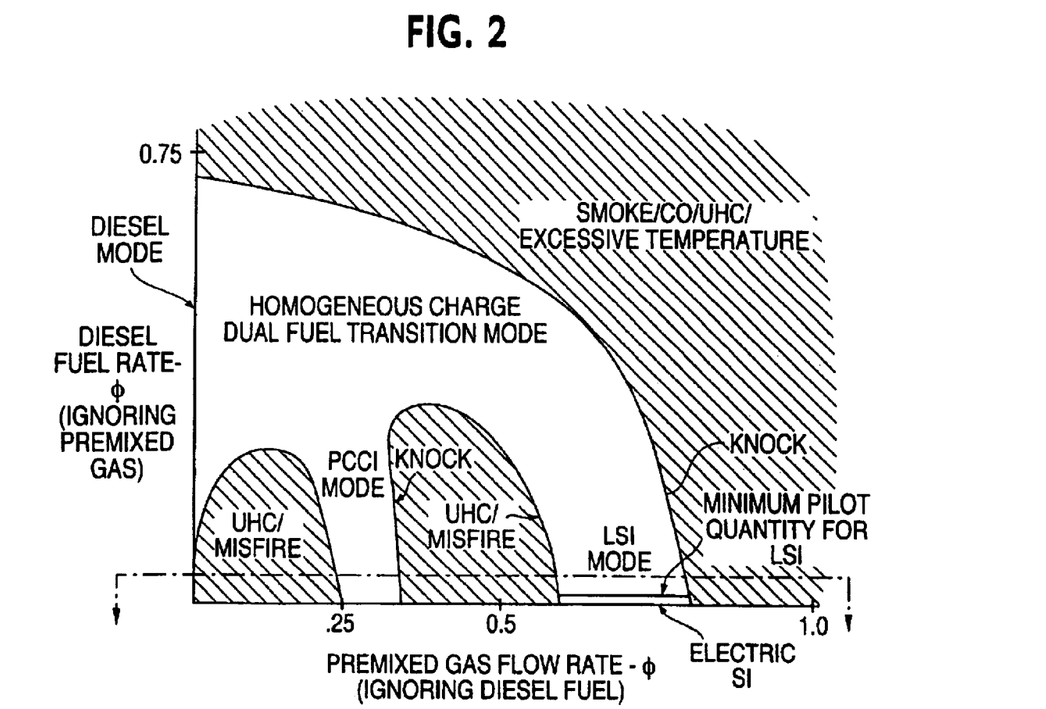
FIG. 2 is a graph showing diesel fuel rate in terms of equivalence ratio versus a premixed gas flow rate in terms of equivalence ratio, to illustrate a continuous operating space for transitioning between modes of engine operation.

The present invention presents an engine and method of operating an engine in various modes based on engine operating conditions to achieve a variety of advantages. Referring to FIG. 2, the present invention recognizes that the multi-mode engine may be transferred between operating modes by continuously controlling combustion via manipulation of certain engine components, such as fuel delivery devices, to achieve a smooth and controlled power delivery and sound quality from the engine thereby avoiding misfire, excessive knock, undesirable emissions, excessive temperatures, undesirable fuel consumption and unnecessary decreases in operating efficiency. FIG. 2 illustrates various unacceptable areas of operation and various acceptable overlapping or adjacent areas or modes of operation. For example, the diesel mode of operation is represented along the Y-axis where diesel fuel is introduced into an engine cylinder while no premixed gas, i.e. natural gas, is introduced. The unacceptable areas of operation are cross-hatched and labeled with the undesirable event likely to occur in that particular area, such as excessive knock or misfire. The premixed charge compression ignition mode is positioned between a knock area and an unburned hydrocarbons (UHC)/misfire area. Likewise, the spark ignition or liquid spark ignition mode is positioned between a knock area and a UHC/misfire area but at a higher premixed gas flow rate or equivalence ratio than the premixed charge compression ignition mode. The homogeneous charge dual fuel transition mode, as shown in FIG. 2, is represented by an area which extends from the diesel mode (Y-axis) to the areas represented by the PCCI mode and the LSI mode. It should be noted that the spark ignition mode having an electrically produced spark is positioned on the X-axis as indicated while the liquid spark ignition mode is immediately above the X-axis as indicated. As shown in FIG. 2, a continuous area or path exists between the various modes of operation thus allowing a controlled smooth transition between, for example, the diesel mode and the premixed charge compression ignition mode by utilizing the HCDFT mode. Likewise, a continuous path exists between the SI/LSI mode and the PCCI mode by adjusting fuel delivery and perhaps other engine conditions such as intake manifold temperature or compression ratio.

It should be noted that the graph of FIG. 2 is merely an approximate representation of the various areas and not intended to indicate the precise equivalence ratios for the fuels in the various modes. Generally, the premixed charge compression ignition mode will operate with an equivalence ratio less than 0.5 while the spark ignition mode will typically operate with an equivalence ratio for the premixed gas of greater than 0.5. More specifically, it is desirable to operate in the premixed charge compression ignition mode with a premixed gas equivalence ratio in the range of approximately 0.25–0.45 and preferably between 0.3–0.35 while the spark ignition mode is likely to occur at greater than 0.6 equivalence ratio for the premixed gas.

Figure 3:
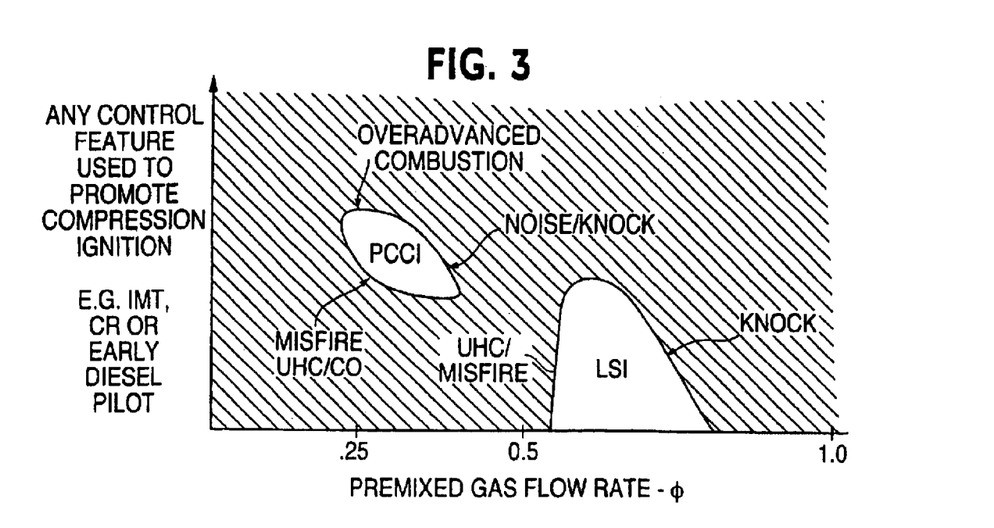
FIG. 3 is a graph showing another dimension of the graph of FIG. 2 with intake manifold temperature versus premixed gas flow rate in terms of equivalence ratio.

The graph of FIG. 2 may be viewed from an overhead perspective with a Z-axis representing any engine control feature capable of promoting compression ignition, such as intake manifold temperature, compression ratio or an early diesel pilot injection as shown in FIG. 3. FIG. 3 more clearly shows that both the PCCI mode and the LSI mode are defined by distinct acceptable operating regions or areas. Since the PCCI mode and LSI modes overlap very little vertically, it can be seen that variations in one or more engine components to effect the desired operating condition, such as intake manifold pressure or compression ratio, may be required to smoothly and controllably transition between the modes. Alternatively, engine operating conditions may be modified so as to abruptly jump from one operating mode to the other operating mode without a smooth controlled transition by, for example, abruptly eliminating the liquid spark while simultaneously adjusting fuel flow to lower the equivalence ratio for the PCCI mode. This abrupt "jumping" between the areas of FIG. 3 disadvantageously results in undesirable fluctuations in power delivery and engine sound quality, and perhaps misfire, undesirable emission and excessive knock. The present invention presents a multi-mode engine capable of operating in specific modes and successfully transitioning between the modes to maximize efficiency, minimize emissions, avoid the undesirable areas of FIG. 2 and create a higher gas substitution rate thereby reducing operating costs due to the lower costs of some gaseous fuels, such as natural gas, per BTU compared to, for example, diesel fuel. In essence, FIGS. 2 and 3 show that the HCDFT mode can be used as a bridge between various modes of operation, for example, between the PCCI mode and the SI/LSI mode, or between the diesel mode and the PCCI mode or the SI/LSI mode.

Figure 4:
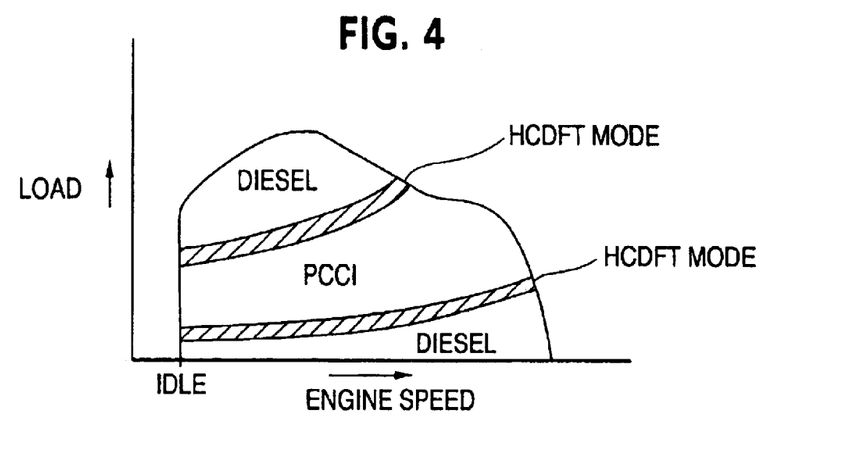
FIGS. 4–6 are graphs showing engine speed versus load and illustrating various combinations of modes of operation and transitions between modes, for different loads.
Figure 5:
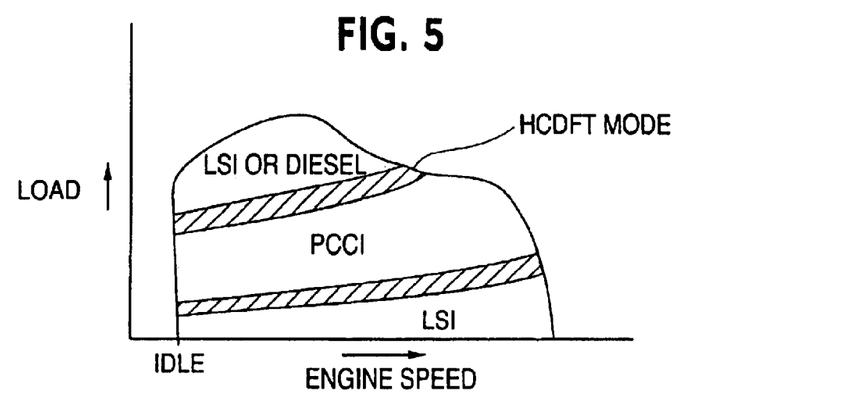
Figure 6:
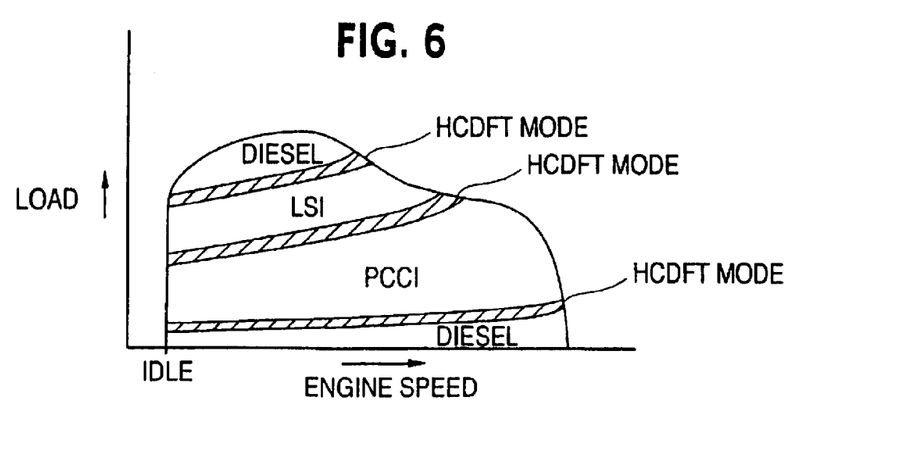

Referring to FIGS. 4–6, the present invention includes engines capable of operating in various combinations of modes and various methods of operating in and transferring between the different modes. For example, FIG. 4 represents one embodiment of the multi-mode engine of the present invention which transfers between the diesel mode of operation and the PCCI mode of operation using the HCDFT mode. Preferably, the engine starts in the diesel mode to promote startability. While it may be possible to operate in the PCCI mode over a significantly wide operating range of engine speeds and load, starting in the PCCI mode is considerably more difficult due to cold engine parts causing large heat transfer losses from the charge, and the absence of heat sources, for example, EGR. As a result, the best implementation of the present multi-mode engine would start in either the diesel or spark ignited modes and transition to the PCCI mode. Generally, the embodiment of FIG. 4 operates upon starting in a diesel mode and transitions to the PCCI mode at light and moderate engine loads by operating in the HCDFT mode for a brief period during the transition. At high engine loads, it may then be desirable to transfer back to the diesel mode from the PCCI mode, again utilizing the HCDFT mode for a brief period during the transfer between the modes.

FIG. 5 represents another embodiment of the present multi-mode engine and method of operation in which multi-mode engine 10 starts in the SI/LSI mode and transitions to the PCCI mode when engine conditions dictate, such as when the engine load and speed reach a predetermined point, by utilizing the HCDFT mode as discussed more fully hereinbelow. Likewise, at higher engine loads, the engine may transfer back to the SI/LSI mode, or to the diesel mode, from the PCCI mode utilizing the HCDFT mode. In the embodiment of FIG. 6, the engine may be started in the diesel mode and transfer to the PCCI mode and then to the SI/LSI mode and then back to a diesel mode at the highest loads. Again, the transitions are made utilizing the HCDFT mode and by controlling one or more engine components as described more fully hereinbelow. In all the embodiments of FIGS. 4–6, the engine may be started in the HCDFT mode (instead of the diesel or SI/LSI modes) and transition to the PCCI mode.

Control system 54 determines the operating conditions for switching or transferring between the various modes of operation and controls the necessary components, such as the fuel delivery devices, in an appropriate manner to achieve the transfer as described more fully hereinbelow. For example, control system 54 preferably considers engine speed and engine load as primary factors and preferably also considers intake temperature, intake/boost pressure and/or whether the particular engine operating event is a transient event or not. For example, the engine may be mapped to create a look-up table in ECU 56 that will define the speed and load ranges at which the engine will run in the diesel mode, in the PCCI mode and in the SI/LSI mode, and at what speed and load ranges the engine will begin transferring to another mode using the HCDFT mode. Also, model-based control could be used to calculate, on a real-time basis, if conditions are favorable for a specific mode of operation and calculate the transition conditions at which the engine should switch. between the modes of operation. The consideration of whether the particular condition or event is a transient event or not could determine a distinct transition strategy. For example, if the ECU receives a signal requesting a substantially large increase in engine output due to a large increase in engine load, the determination may be made to transfer from the SI/LSI or diesel starting mode directly to the opposite diesel or SI/LSI mode for high load conditions while skipping the PCCI mode. On the other hand, if the ECU determines the transition to be more gradual and/or the load request to be much smaller, e.g. increasing from 15% load to 40% load, control system 54 may proceed to transfer to the PCCI mode.

In the preferred embodiment of the invention, natural gas is used as the fuel which is premixed with air in the PCCI mode and the HCDFT mode while diesel fuel is used as the liquid spark in the LSI mode and as the fuel introduced near top dead center position in the diesel mode and the HCDFT mode. However, as previously stated, various other fuels may be used such as gasoline, alcohols, propane, hydrogen, lube oil and kerosene. Preferably, other high cetane fuels would be used in place of the diesel fuel and low cetane fuels would be used as a substitute for the natural gas.

A preferred method of transitioning between diesel mode operation and PCCI includes utilizing the homogeneous charge dual fuel transition (HCDFT) mode in the following manner. Multi-mode engine 10 starts in a pure diesel mode with direct injector 62 injecting a high cetane fuel, i.e. diesel fuel, around top dead center position of piston assembly 14 to achieve conventional diesel combustion. Therefore, during start-up, or at some other point of engine operation, the engine is operating in the diesel mode operating on diesel fuel only in the form of a late/typical diesel injection event. At the beginning of operation, or at some other point during operation, an early pilot injection quantity would be injected by direct injector 62 prior to the injection of the conventional diesel injection event and preferably prior to approximately 60 degrees before top dead center. Further details regarding the use and implementation of an early diesel pilot are set forth in detail in co-pending patent application entitled "Internal Combustion Engine Operable in PCCI Mode with Early Control Injection and Method of Operation" filed on the same date as the present application and the entire contents of which is hereby incorporated by reference. The early pilot injection quantity comprises a small percentage of the total fuel energy while substantially the entire amount of fuel energy would be injected during the typical diesel injection event by direct injector 62. The premixed gas, i.e. natural gas, would then be added to the intake system 18 either at 64, 66 or by port injector 68, or alternatively an in-cylinder injection using injector 70, in a step change to some level of fueling, e.g. φ greater than approximately 0.25, to ensure reasonably complete combustion in the homogeneous/premixed portion of the charge (i.e. the portions not directly impacted by the late diesel injection). Preferably, nearly simultaneously with the increase in natural gas, the quantity of the late diesel injection is reduced so that the total engine torque remains at a substantially constant level to achieve a smooth power transition with minimal engine noise. With a natural gas port injection system, e.g. using port injector 68, which allows fueling changes to be made promptly on a cycle-by-cycle basis, the adjustments in fuel quantities can be easily achieved. In the embodiment utilizing the upstream mixed/premixed natural gas introduced at 64 or 66 in FIG. 1, the transport delay from the point of natural gas introduction into intake system 18 to combustion chamber 16 would be determined and considered by control system 54 in calculating the timing of the reduction of the late fuel injection quantity so that the total fuel energy delivered to combustion chamber 16 remains relatively constant except for necessary adjustments to fuel flow due to operating efficiency. Once engine 10 is operating on both the premixed natural gas and the late diesel injection, the engine is operating in the homogeneous charge dual fuel transition (HCDFT) mode. The quantity of late diesel injection is then reduced until substantially all of the fuel energy is derived from the natural gas of the premixed charge and only a very small quantity of diesel fuel is being injected near top dead center to ensure/anchor combustion. Depending on the application, the late diesel injection quantity may be reduced/trimmed automatically through a speed or load governor used for operation in the diesel mode and existing on most diesel engines. At this point, if not already introduced, the early diesel pilot quantity is initiated. The amount of diesel injected during the early diesel pilot injection event is increased until SOC is pulled ahead of, that is, occurs prior to, the late diesel injection event. Combustion sensor 50 may be used to detect ignition or the start of combustion and generate an appropriate signal to ECU 56 which in turn controls injector 62 in the appropriate manner to adjust the quantity of the early pilot diesel injection event. When the SOC occurs before the late diesel injection event, it is understood that the early diesel pilot injection quantity is controlling the SOC and compression ignition is occurring without the assistance of the late diesel injection. The late diesel injection quantity may then be either eliminated entirely with no significant impact on combustion performance or maintained to some degree as a post-ignition injection to reduce emissions as discussed hereinbelow. The steps for transitioning from the diesel mode to the PCCI mode may then be simply reversed to transition from the PCCI mode to the diesel mode of operation. One of the advantages of the present multi-mode engine and method of operation is maximizing the quantity of natural gas relative to the quantity of diesel fuel used. In order to maximize the fraction of natural gas (i.e. the substitution rate), it can now be seen that a "path" in FIG. 2 can be followed which minimizes the amount of diesel fuel used thereby minimizing fuel costs. This path requires varying the fraction of diesel fuel by varying the diesel fuel rate which in part varies the compression temperature by the changing energy release from the diesel pilot. The intake manifold temperature or top dead center compression temperature may be further varied as required using any engine component capable of changing temperature such as control of air cooler 32 and/or EGR circuit 44 and/or heaters (not shown). Of course, there is a tradeoff between the ease and robustness of the control system versus the amount of diesel fuel injected. The higher the percentage of diesel fuel, the easier it is to control the engine. As the amount of diesel fuel is reduced (and the fraction of natural gas is increased) more sophisticated controls and sensors are likely required.

Another embodiment of the present invention is to operate multi-mode engine in accordance with graph of FIG. 4 but using only a single fuel, such as diesel fuel or gasoline, for all modes of operation. For this embodiment, or any other embodiment discussed herein, a post-ignition injection may also be provided after PCCI ignition has occurred once operating in the PCCI mode to place the engine in what may be referred to as a post premixed ignition injection (PPII) mode. That is, an additional quantity of fuel, i.e. diesel fuel or natural gas, is injected after the start of a PCCI combustion event, either during the PCCI combustion event or after the combustion event has ended. This post premixed ignition injection quantity results in reducing exhaust emissions and improving fuel efficiency. The details of the use and implementation of the post-ignition injection are disclosed in co-pending application entitled "Internal Combustion Engine Operable in PCCI Mode with Post-Ignition Injection and Method of Operation" filed on the same day as the present application and the entire contents of which is hereby incorporated by reference. Of course, a post-ignition injection may be used in the PCCI mode with any of the embodiments discussed herein to achieve the stated advantages. In the present single fuel embodiment, a single direct injector 62 is used to perform each injection without the need for other fuel delivery devices. Alternatively, a single fuel could be delivered into the intake system 18 or using port injector 68 in combination with direct injector 62 to ensure sufficient premixing of the diesel fuel during the PCCI mode. The multi-mode engine of the present embodiment is started in a conventional diesel mode as shown in FIG. 4 and transferred to the PCCI mode for light load operation using the transition steps discussed hereinabove. Preferably, the engine is naturally aspirated during light load operation. Moreover, it is preferred that the engine have a low compression ratio since diesel fuel has a strong low temperature reactivity and will be used in the PCCI mode. Another manner of compensating for the strong low temperature reactivity of the diesel fuel is to utilize cooled EGR to ensure the SOC is placed near top dead center. At moderate engine loads, the engine may continue to operate in the PCCI mode or may operate in the post premixed ignition injection mode by adding the post injection in accordance with the aforementioned patent application. At moderate loads, the engine may use turbocharging, supercharging or may be naturally aspirated. Using the reverse steps of the process described hereinabove for transitioning from a diesel mode to a PCCI mode, the engine of the present embodiment may be transferred to a conventional diesel mode of operation at high loads or operated in the post premixed ignition injection mode. Again, the engine may be turbocharged, supercharged or naturally aspirated at high loads. Preferably, the geometric compression ratio is high, i.e. approximately 16–17:1. Variable valve timing may be used to vary the effective compression ratio or expansion ratios. In addition, hot EGR and possibly cooled EGR may be used to control the overall start of combustion while the start of combustion for each cylinder could be balanced by trimming the amount of fuel injected. This engine is beneficial in that it uses only one fuel and thus is much simpler to operate than a dual fuel engine which may require modifications to existing engines and more complex and robust controls. Applicants' studies have shown that, when in the PCCI mode for a particular test situation, the intake manifold temperature required to place the start of combustion at TDC for diesel fuel is approximately 317 K, when IMP equals 0.5 bar absolute and the compression ratio is 16.3:1. This temperature is easily attained at the stated IMP. To operate in the PCCI mode at higher loads, the geometric compression ratio could be lower, the effective compression ratio could be lowered using variable valve timing, or cooled EGR could be used to suppress autoignition while maintaining a high geometric compression ratio, i.e. 16.3:1. This embodiment of the engine may use high swirl, high EGR and/or short injection duration near or after TDC to obtain a mostly premixed combustion at high loads or at moderate loads thereby resulting in low emissions. Also, it should be noted that other fuels having strong low temperature reactivity may be used instead, such as kerosene or gasoline.

The steps for transitioning from the SI or LSI mode to the PCCI mode for any of the embodiments operating in these two modes may be essentially the same as the above described steps for transitioning between the diesel mode and the PCCI mode. Specifically, if operating in the LSI mode, the quantity of the diesel pilot functioning as a liquid spark is increased simultaneous with a decrease in the quantity of natural gas so as to maintain engine torque at a substantially constant level. Thus, the total delivered fuel energy is essentially maintained at a relatively constant level except for adjustments for efficiency changes. In other words, the engine would be calibrated to adjust fuel flow for efficiency change to achieve a relatively constant torque. Preferably, this increase in the diesel fuel and decrease in the natural gas would continue until the diesel fuel and the natural gas each contribute approximately 50% of the total delivered fuel energy and the equivalence ratio of the premixed charge of the natural gas and air is within the operating range for PCCI mode operation, i.e. less than 0.5, and preferably approximately 0.35. An early diesel pilot injection quantity would then be added and the late diesel injection reduced. The early diesel pilot quantity would be increased until the SOC is advanced ahead of the injection of the late conventional diesel injection. The late diesel injection event can then be eliminated since compression ignition is occurring successfully. Transfer from the PCCI mode to the LSI mode would simply involve the reverse performance of these steps. As can be seen, the engine actually operates in the homogeneous charge dual fuel transition mode when the quantity of the liquid spark has increased to a level sufficient to function as a diesel injection quantity into a premixed charge leaner than the charge supplied during the LSI mode which involves a mixture rich enough to propagate a flame (typically $\phi$ greater than 0.5). When transferring from an electrical SI mode (as opposed to the liquid SI mode), the direct injector 62 would begin injecting a quantity of fuel near top dead center and increasing this quantity as the premixed gas is decreased. The remainder of the steps above are the same.

Transfer between the diesel mode and the LSI mode, for example as suggested by the embodiment of FIG. 6, is also achieved by moving through the HCDFT mode. The liquid spark quantity would be increased simultaneously with the decrease in the quantity or flow rate of the premixed gas so as to maintain engine torque at a substantially constant level and place the engine in a HCDFT mode. A transfer into the diesel mode is then substantially the same as described hereinabove. With respect to the embodiment of FIG. 5, it should be noted that the engine may be operated in a diesel mode instead of the LSI mode at high engine load. Moreover, with respect to each of the embodiments, the particular engine may transition from the starting mode, i.e. diesel or SI/LSI into a PCCI mode via the HCDFT mode without the need to further proceed into another mode depending on the particular application and operating conditions.

Figure 7:
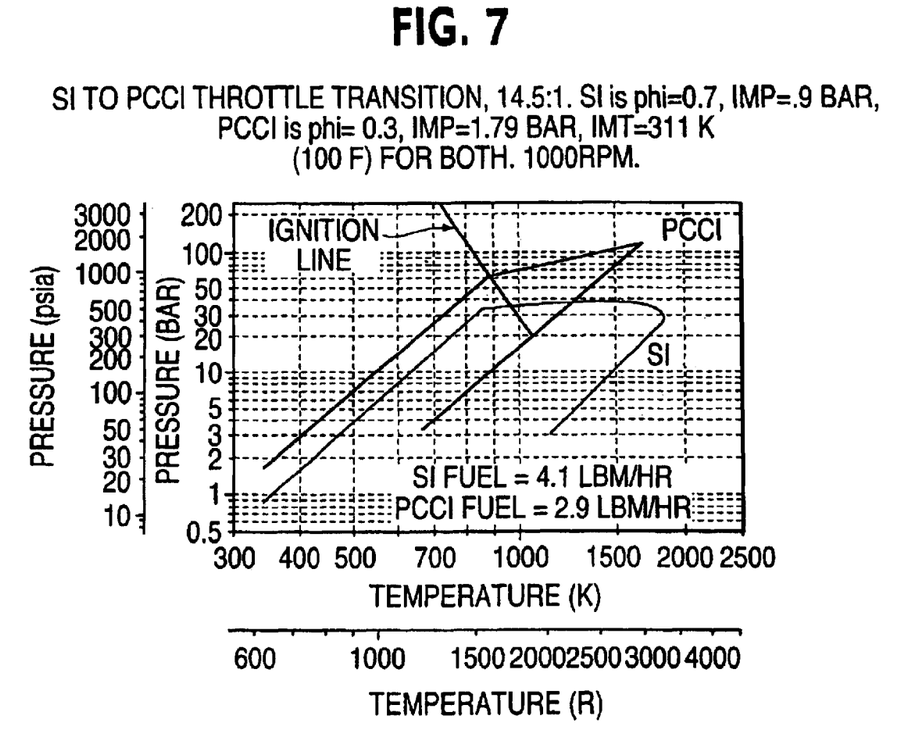
FIG. 7 is a graph showing cylinder pressure as a function of cylinder temperature to illustrate the effect of throttle opening.
Figure 8A:
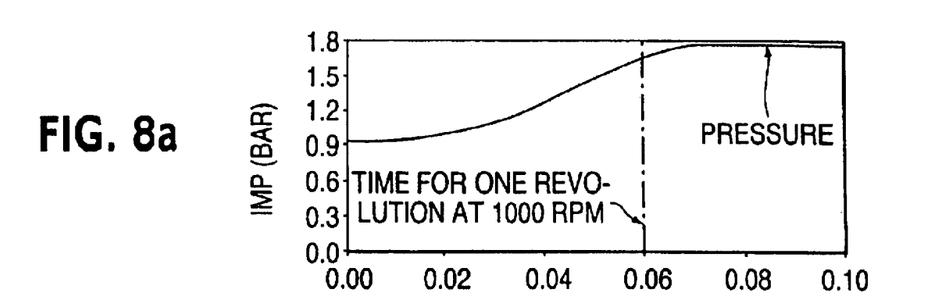
FIGS. 8a–8c are graphs showing intake manifold pressure, degrees of throttle opening, and throttle flow area as a function of time.
Figure 8B:
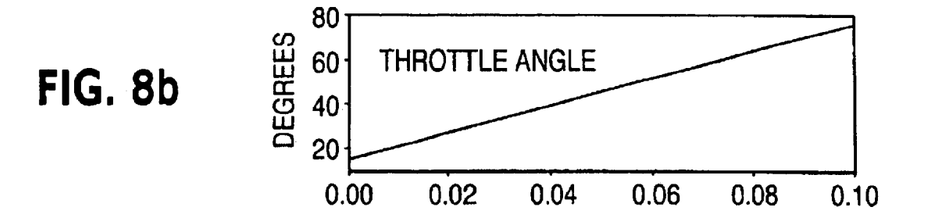
Figure 8C:
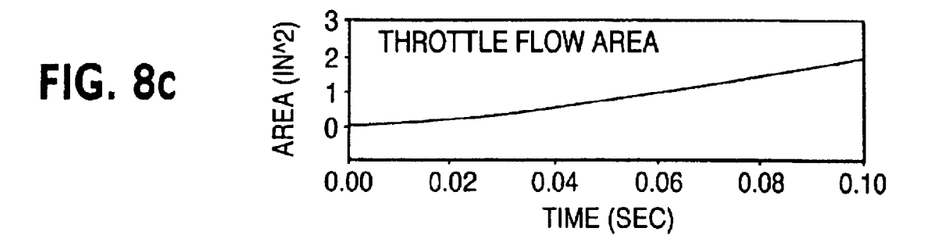

The present invention is also directed to the multi-mode engine of FIG. 1 capable of being quickly transitioned or transferred between the SI/LSI mode and the PCCI mode by quickly adjusting air flow to the engine thereby modifying the equivalence ratio sufficiently to support PCCI combustion. Generally, throttle 30 of FIG. 1 is snapped open during SI operation while keeping the fuel rate constant. Specifically, with the throttle partially closed, the engine initially operates in normal lean-burn spark ignition mode with an intake manifold pressure of, for example, 7 psi and an equivalence ratio of, for example, 0.7. By snapping throttle 30 open (just after the intake valve closing of the last SI cycle), the intake manifold pressure is increased to approximately 14 psi while holding the fuel rate constant thereby reducing the equivalence ratio to approximately 0.35. The increased intake and therefore compression pressure pushes the charge over the ignition line as shown in FIG. 7 thereby placing the engine in the PCCI mode. In FIG. 7, the lower curve represents normal SI combustion where end gases are not pushed over the ignition line by compression heating as the rest of the charge burns. The upper PCCI operating line illustrates the autoignition of the entire charge when pushed over the ignition line by piston compression. Because this transition between the SI mode and the PCCI mode occurs at or near a constant fuel flow rate, brake (torque/HP) output remains nearly constant/smooth during the transition. Intake pressure as well as fueling levels on either side of the transition may be manipulated to offset differences in combustion efficiency and pumping mean effective pressure so as to provide a seamless transition (smooth/constant torque) between the modes. Applicants have determined the conditions needed to effect such a transition without changing the brake torque of the engine. These conditions along with the effect on intake manifold pressure, throttle angle over time and throttle flow area over time are illustrated in FIGS. 7 and 8a–8c. It should be noted that the time for one engine revolution (half an engine cycle) is about the same amount of time needed for IMP to rise sufficiently. Thus, by coordinating the transition properly, a successful SI cycle should be followed by an effective PCCI cycle with no non-firing cycles in between.

As indicated, the previously discussed method used to transfer the SI mode of operation and the PCCI mode is equally effective for transfers from either a liquid spark ignition (LSI) mode or an electric spark ignition mode to the PCCI mode since LSI is almost identical to normal electric SI operation in that the primary combustion mechanism is propagation of a flame through a pre-mixed charge. The primary difference is that, instead of igniting the charge with a spark, the charge is ignited by a small/pilot injection of diesel (or other high cetane/low octane) fuel near TDC. This pilot burns in a diesel mode (diffusion flame) and ignites a portion of the premixed charge. LSI is particularly attractive in its ability to generate heat quickly for starting an engine. Because of the overall richer mixtures required to propagate a flame (relative to diesel), cycle temperatures are much higher. These increased temperatures lead to an engine warming up much more quickly when in the SI/LSI mode than when in a diesel mode. Since the ability to operate in the PCCI mode is strongly related to the temperature of the combustion walls (through the effects of heat transfer on charge temperature), the faster the engine can be warmed up, the faster operation can be successfully transitioned to the PCCI mode. This same transition scheme may also be applied to transitioning from stoichiometric or even rich SI/LSI combustion into the PCCI mode: fundamentally the throttle is snapped open with nearly constant fuel rates and the equivalence ratio drops as the intake pressure increases which results in compression pressures and temperatures high enough to push the charge over the ignition line into the PCCI mode. The process can also be reversed to transfer back into the PCCI mode from the SI/LSI modes. It is reasonable to assume that during the transition the intake temperature may remain constant considering the very significant thermal inertia of the engine and intake components and the fact that the transition occurs within one engine cycle. However, in returning to SI/LSI operation from the PCCI mode, if suitable means for making rapid changes in intake temperature were available, these means could be used to help manage a smooth transition. For example, port injection of water or methanol (or other alcohol) could be used to significantly drop the intake temperature (by heat of vaporization effects) to help facilitate a change from PCCI to SI/LSI operation.

In essence, the aforementioned process of snapping throttle 30 open decreases the equivalence ratio about half thereby allowing a jump from the electric SI portion of the X-axis in FIG. 2 or the LSI area of FIG. 2 across the undesirable area into a PCCI mode area from one engine cycle to the next while maintaining power substantially constant. Because power or engine torque is primarily a function of fuel rate, the airflow must be changed very quickly while holding the fuel rate substantially constant. With port or direct fuel injection into the cylinder, this process can be achieved fairly easily as described. However, with an upstream mixed fuel delivery system, the pressure/air flow change will lead the equivalence ratio change thereby likely causing misfire when transitioning from the PCCI mode to the SI/LSI mode and heavy (potentially damaging) knock when transitioning from the SI/LSI mode to the PCCI mode. One solution is as follows. Consider the engine running in the SI/LSI mode with the intake pressure throttle to 0.5 bar and an equivalence ratio of 0.7 (with the premixed gas, i.e. natural gas, making up most if not all of the fuel). At the start of the transition, the natural gas flow would start being reduced and diesel fuel added (via for example direct injector 62) in such a way that the total fuel energy flow remains essentially constant. This would continue until the diesel and natural gas were each contributing about 50% of the total fuel energy (natural gas equivalence ratio approximately 0.35). This could be done using open loop with knowledge of the transport delay of the premixed charge through the intake system. At this point, the throttle is snapped open to cause the intake manifold pressure to rise to one bar while shutting off the diesel injection. The increased manifold and compression pressure drives the charge over the ignition line as described above. Because the manifold pressure doubles with the snap opening of the throttle, the amount of natural gas entering the cylinders doubles. However, elimination of the diesel negates that effect thereby allowing the total fuel energy (power) to remain essentially constant. The same basic process could be repeated in reverse to accomplish a transition from PCCI to SI/LSI operation. Of course, as with all the embodiments described herein, different fuels could be used or a single fuel application may be desirable in the present embodiment.

As discussed hereinabove, one of the key difficulties in transitioning from a spark ignition/LSI mode to a PCCI mode is that the PCCI mode does not run well at equivalence ratios that are richer than approximately 0.5 and the SI/LSI mode does not typically run at equivalence ratios leaner than approximately 0.5. Ideally the PCCI mode would operate with an equivalence ratio of 0.35 to 0.40 and the SI mode with an equivalence ratio approximately within the range of 0.65 to 0.7. Keeping the air flow relatively constant while significantly increasing fuel flow to achieve SI mode operation, disadvantageously results in a sudden increase in indicated mean effective pressure which is, typically, undesirable as noted hereinabove. Moreover, it is desirable to avoid very heavy, destructive knock as transfer is made into the SI/LSI mode. The previous discussion relating to increasing airflow by snapping throttle 30 open effectively addresses these concerns. The present embodiment however presents another engine and method for successfully transitioning between the SI/LSI mode and the PCCI mode. In general, the present embodiment includes rapidly switching from the SI/LSI mode with an early (or late) intake valve closing (also known as Miller cycling) to the PCCI mode with "normal" valve events. Specifically, with the engine operating in the SI/LSI mode with Miller cycling, the effective compression ratio is much lower than the geometric compression ratio thereby avoiding knock. Moreover, the Miller cycling operation significantly lowers the volumetric efficiency of the engine relative to traditional valve timing. As shown in FIG. 2, control system 56 may be used to control a variable valve timing system 80 to switch from Miller cycling to normal valve timing. Any one of several conventional variable valve timing systems may be used such as disclosed in U.S. patent application Ser. No. 09/255,780 filed Feb. 23, 1999 and assigned to the assignee of the present application, the entire contents of which is hereby incorporated by reference. By keeping the fuel flow rate (either very early direct injection or port injection) relatively constant, the equivalence ratio drops because the volumetric efficiency increased dramatically along with the airflow. Also, the effective compression ratio increases causing the premixed charge to be pushed over the ignition line placing the engine in the PCCI mode. This sequence of events is simply reversed to move from the PCCI mode to the SI/LSI mode. Thus, the present embodiment enables the engine to transfer between a spark ignition mode and a premixed charge compression ignition mode by adjusting the timing of the closing of the intake valves via a variable valve timing system.

Another embodiment of the present invention includes an engine adapted to, and a method for, transitioning from a stratified charge SI/LSI mode to a PCCI mode. Stratified charge spark ignition engines normally operate with an equivalence ratio less than 0.5 making transfer to the PCCI mode more easily achievable. Preferably, the engine would operate with direct injection spark ignition with an equivalence ratio of approximately 0.35. Spark timing, whether electrically produced or liquid would occur, for example, at approximately 30 degrees before top dead center. The top dead center compression temperatures and pressures may then be adjusted to be suitable for PCCI mode operation. This adjustment may be accomplished using EGR, heaters, coolers, etc. Thus, 100% of the fuel is directly injected into the cylinder much earlier than the top dead center position and then the mixture is spark ignited with an electronic or liquid spark closer to top dead center to kick the charge over the ignition line. The timing of the primary injection if a liquid spark is used, or the only injection if an electric spark is used, is then advanced to obtain a homogeneous mixture, as opposed to the stratified mixture, having the same equivalence ratio of approximately 0.35 in the present example. Alternatively, port fuel injection may be used. If during SI/LSI operation, the top dead center compression temperature is high enough to cause autoignition, the engine will run like a diesel engine without any problems. It should be noted that the transition need not occur for all cylinders of a multi cylinder engine at the same time. Moreover, the transition need not occur over a single cycle in the same cylinder but may gradually occur over a number of cycles such that operation alternates between SI/LSI and PCCI modes for several cycles before completely switching to the desired mode. This embodiment importantly permits transfer at the same equivalence ratio and operation in a mode that is insensitive to top dead center temperatures. In the SI stratified mode, if the temperature is low, the charge will ignite with the spark. If the temperature in the cylinder is high, the charge will compression ignite and burn like a typical diesel engine. This engine could easily be started in the direct injection-spark ignition mode and transferred to the PCCI mode. Moreover, this type of engine would be able to quickly change to a low load condition. Of course, if needed, at high loads, the engine could be operated in a direct injection-SI mode at richer equivalence ratios than those used in the PCCI mode. This method would allow rapid load acceptance. Once the engine has built up boost pressure, transfer could be made back to the low emission PCCI mode.

Applicants have also determined that, when operating in the PCCI mode, it is advantageous to target an equivalence ratio that creates the highest peak cycle temperatures that still allow all other constraints to be met, such as emissions within target limits; peak rate of pressure rise, knock index and combustion generated noise within target limits; and SOC at targeted crank angle (typically achieved by other controls). The highest peak cycle temperature may be achieved by increasing the equivalence ratio, or increasing the mass fraction of fuel in the charge. This manner of operation advantageously lowers UHC and CO, increases exhaust temperatures leading to higher catalyst efficiency and improved turbocharger performance, and higher thermal efficiency. The optimum peak cycle temperature is likely to be between 1700–2000 K.

Figure 9:
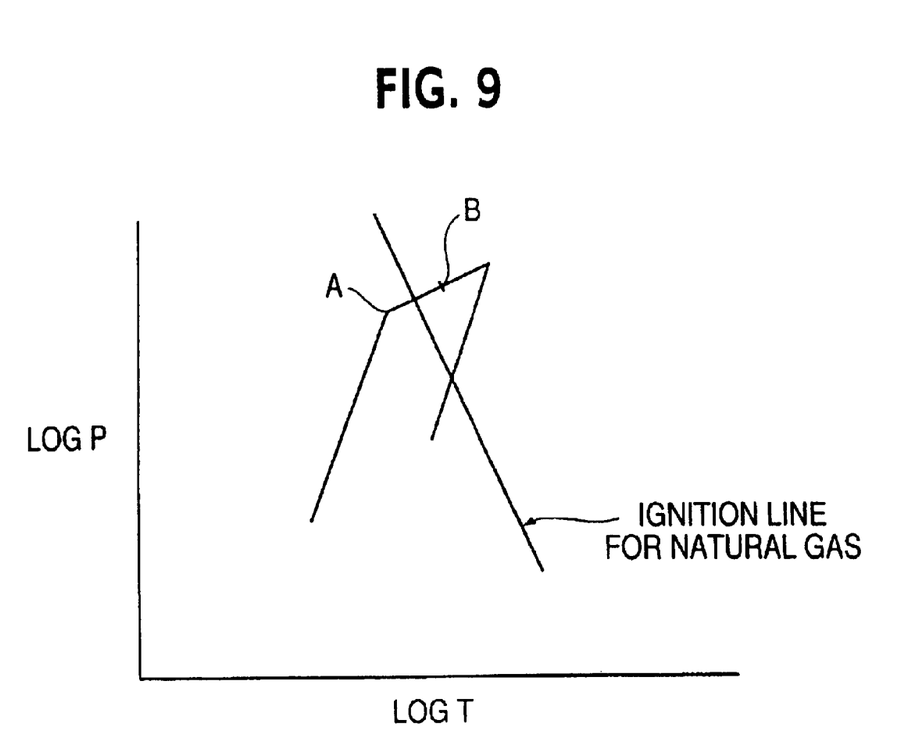
FIG. 9 is a graph showing cylinder pressure as a function of cylinder temperature.

One of the key challenges of operating in the PCCI mode is controlling SOC. Applicants have determined that another advantageous way of effectively achieving PCCI operation while accurately controlling SOC is to utilize a very late diesel pilot (or some other fuel that compression ignites easily) in conjunction with a relatively well mixed natural gas or other fuel that is harder to compression ignite than the late pilot fuel (i.e. diesel fuel). The natural gas is also preferably very well mixed. The intake conditions and the compression ratio are chosen so that the natural gas, which has been premixed, does not compression ignite without any additional fuel. In the preferred embodiment, the natural gas/air mixture would be close to compression ignition at top dead center. Of course, an early diesel pilot quantity could also be used but the combination would still be close to, but not able to achieve, compression ignition. Near top dead center, the late pilot, i.e. diesel fuel, is direct injected into the cylinder very rapidly and with a high injection pressure to allow the diesel fuel to mix to an equivalence ratio well below stoichiometric before the fuel compression ignition. This does not require the bulk or all of the ignition event to be completed before combustion starts. To ensure this happens, the ignition delay may be increased with EGR, very high swirl and/or a lower cetane number diesel or other fuel. This mode of operation is best illustrated in FIG. 9 wherein the natural gas/air mixture is compressed to a point short of the ignition line and then the diesel fuel is injected, becomes well mixed and ignites at point A resulting in a near constant volume combustion to point B past the natural gas ignition line causing the natural gas/air mixture to ignite.

The key to this method is to create a relatively well mixed diesel air cloud (plus the natural gas) before ignition occurs. This mode of operation is advantageous in creating very low oxides of nitrogen due to lean uniform equivalence ratio distribution, and very low soot due to a uniform mixture. In addition, combustion is forced to start shortly after top dead center and very fast PCCI type combustion occurs. Moreover, injection occurs when the gas density is high and therefore wall wetting is avoided. It is noted that only a relatively small amount of diesel fuel is needed but would increase as load decreases. This mode certainly results in high efficiency due to high compression ratios and a shorter combustion event. Also, this mode may be combined with a post start of combustion/ignition injection of fuel, e.g. diesel fuel, to lower UHC as discussed hereinabove as the PPII mode.

INDUSTRIAL APPLICABILITY

The present PCCI engine and control system may be used in any stationary or nonstationary power plant, including any automotive, industrial, marine or military application. The present PCCI engine and control system is especially advantageous in any power generation application where low emissions are desirable.

We claim:

1. A multi-mode internal combustion engine capable of operating in a plurality of modes for engine operation, comprising:

an engine body;

a combustion chamber formed in the engine body;

an intake air system for delivering intake air to said combustion chamber, said intake air system including an intake port and an intake valve for controlling flow of one of air and a mixture of air and fuel through said intake port;

a fuel delivery system mounted on said engine body for supplying fuel for combustion in said combustion chamber;

a spark ignition means for initiating a start of combustion when operating in a spark ignition mode;

a variable valve timing system for varying a timing of closing of said intake valve;

a control system for controlling said variable valve timing system to, at least one of:
transfer engine operation from said spark ignition mode to a premixed charge compression ignition mode by adjusting said timing of said closing of said intake valve to increase an effective compression ratio; and
transfer engine operation from said premixed charge compression ignition mode to said spark ignition mode by adjusting said timing of said closing of said intake valve to decrease an effective compression ratio.

2. A method of operating an internal combustion engine capable of operating in a plurality of modes for engine operation and transferring operation between the plurality of modes, comprising the steps of:

delivering intake air to a combustion chamber of the engine, said intake air system including an intake port and an intake valve for controlling flow of one of air and a mixture of air and fuel through said intake port;

supplying fuel for combustion in said combustion chamber;

providing a spark ignition means for initiating a start of combustion when operating in a spark ignition mode;

performing at least one of: i) transferring engine operation from said spark ignition mode to a premixed charge compression ignition mode by adjusting said timing of said closing of said intake valve to increase an effective compression ratio; and ii) transferring engine operation from said premixed charge compression ignition mode to said spark ignition mode by adjusting said timing of said closing of said intake valve to decrease an effective compression ratio.

3. The engine of claim 1, wherein said spark ignition mode includes a liquid spark comprising a pilot quantity of a fuel for igniting a premixed charge of said fuel and air.

4. The engine of claim 1, wherein said control system is further adapted to cause said fuel delivery system to deliver a post-ignition injection of a fuel into said combustion chamber after a start of combustion of a premixed charge of said fuel and air in said combustion chamber when in said premixed charge compression ignition mode to operate the engine in a post premixed ignition injection mode.

5. The method of claim 2, further including the step of directing an exhaust gas into the combustion chambers to control a start of combustion for the combustion chamber receiving the exhaust gas when operating in the premixed charge compression ignition mode.

6. The method of claim 2, further including the step of sensing a combustion characteristic, generating a combustion characteristic signal and controlling a start of combustion based on said combustion characteristic signal when operating in the premixed charge compression ignition mode.

7. The method of claim 2, wherein said spark ignition mode includes a liquid spark comprising a pilot quantity of fuel for igniting a premixed charge of fuel and air.

* * * * *